No. 638,578. Patented Dec. 5, 1899.
J. HARTNESS.
BOX SLIDE FORMING TOOL.
(Application filed Aug. 31, 1898.)
(No Model.) 3 Sheets—Sheet 1.
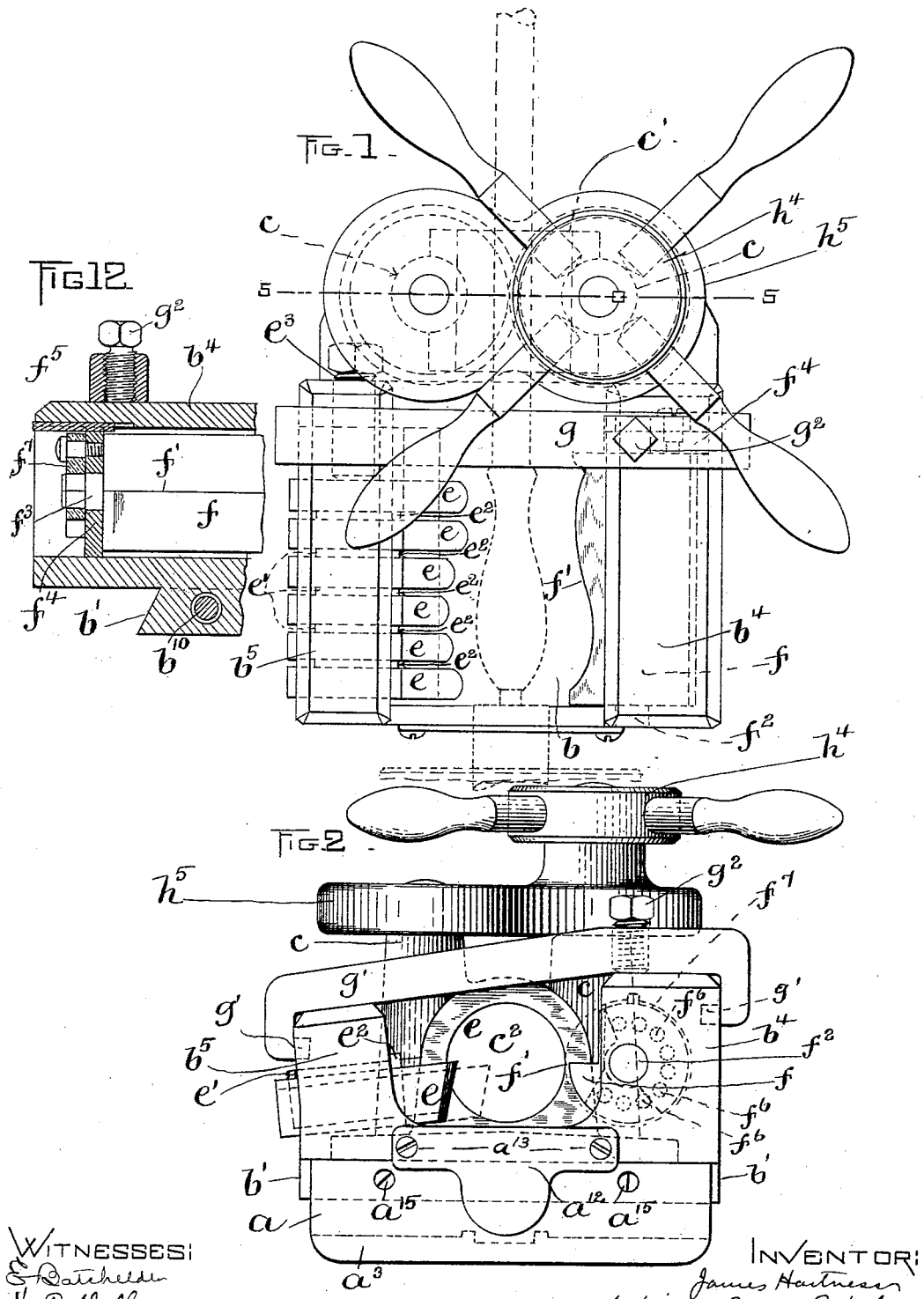

No. 638,578. Patented Dec. 5, 1899.
J. HARTNESS.
BOX SLIDE FORMING TOOL.
(Application filed Aug. 31, 1898.)
(No Model.) 3 Sheets—Sheet 2.
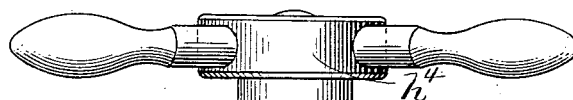
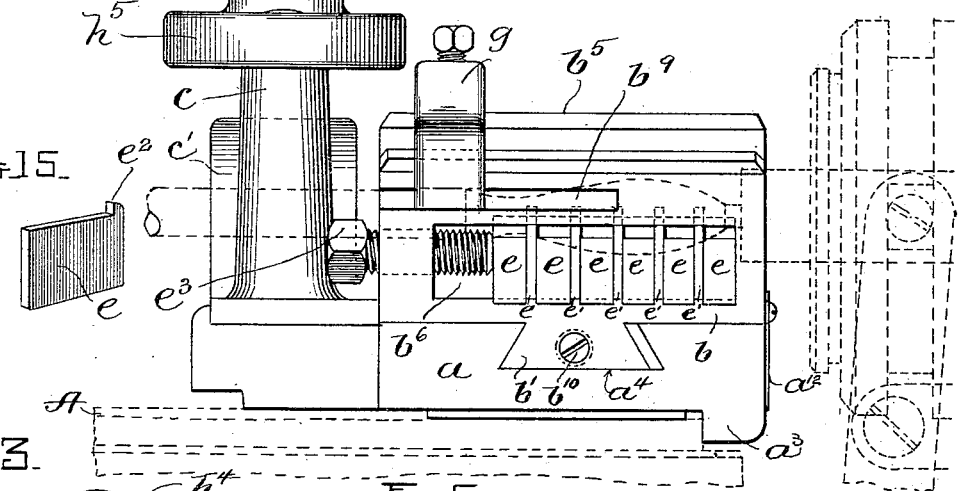
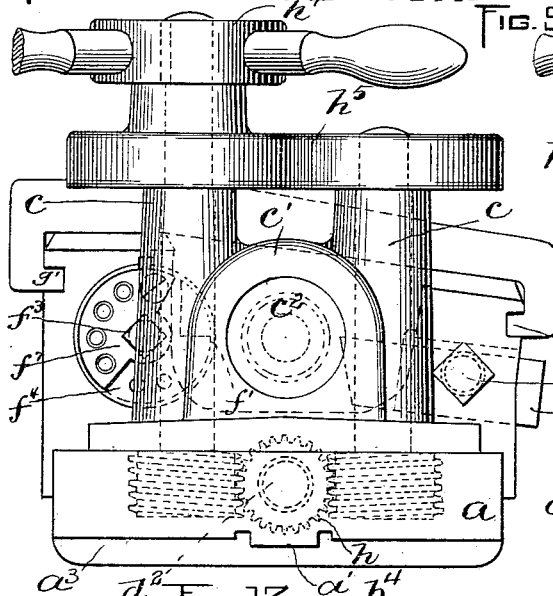
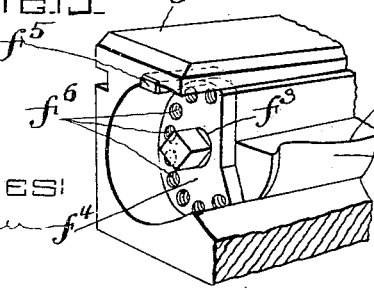
WITNESSES:
E Batchelder
W. P. Abell
INVENTOR:
James Hartness
by Knight Brown & Quinby
Attys.

No. 638,578. Patented Dec. 5, 1899.
J. HARTNESS.
BOX SLIDE FORMING TOOL.
(Application filed Aug. 31, 1898.)
(No Model.) 3 Sheets—Sheet 3.
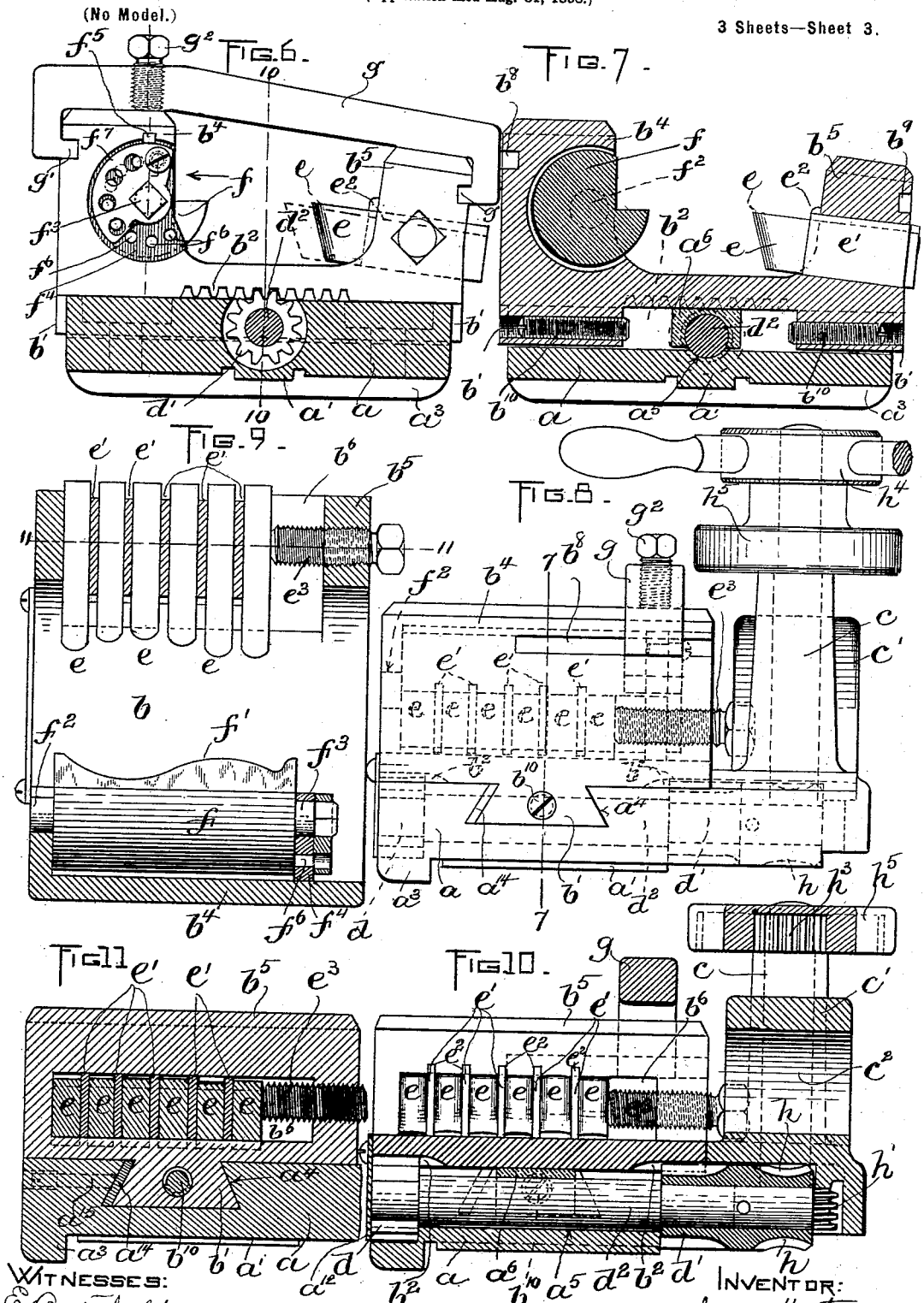
WITNESSES: INVENTOR:

UNITED STATES PATENT OFFICE.

JAMES HARTNESS, OF SPRINGFIELD, VERMONT.

BOX-SLIDE-FORMING TOOL.

SPECIFICATION forming part of Letters Patent No. 638,578, dated December 5, 1899.

Application filed August 31, 1898. Serial No. 689,962. (No model.)

*To all whom it may concern:*

Be it known that I, JAMES HARTNESS, of Springfield, in the county of Windsor and State of Vermont, have invented certain new and useful Improvements in Box-Slide-Forming Tools, of which the following is a specification.

This invention has relation to tools and cutters for lathes, and has for its object to provide certain improvements therein whereby the stock may be expeditiously "roughed out" or finished in the shape of handles and other articles.

Another object of the invention is to provide a tool having a plurality of interchangeable cutters of different heights and thicknesses, with provisions for detachably and adjustably securing them, whereby their cutting edges may be so located as to secure a top rake on the stock irrespective of the variable diameter thereof.

Still another object of the invention is to provide novel means for clamping the sectional cutters in the tool, whereby they may be expeditiously inserted or removed and while they are in place are able to withstand all the strains resulting from the cutting operation.

Other objects of the invention are to provide a tool having provisions for receiving interchangeable roughing-cutters and holding them at any desired position, so as to secure their greatest effectiveness, and to provide such other improvements as will increase the capacity of tools of this class, render them more accurate, and enhance their general efficiency.

To these ends the invention consists of a tool possessing certain features, characteristics, or parts, all as fully illustrated upon the drawings and now to be described in detail and finally pointed out in the claims.

Reference is to be had to the accompanying three sheets of drawings, forming a part of this application, in which like characters indicate like parts wherever they occur.

In the drawings, Figure 1 represents a plan view of the cross-slide-forming tool embodying my invention. Fig. 2 represents an elevation of the same from one end. Fig. 3 represents an elevation from the other end. Fig. 4 represents a rear elevation. Fig. 5 represents a transverse section on the line 5 5 of Fig. 1. Fig. 6 represents a transverse section to show the slide in end elevation. Fig. 7 represents a section on line 7 7 of Fig. 8. Fig. 8 represents a front elevation of the tool. Fig. 9 represents a horizontal section through the tool. Fig. 10 represents a section on line 10 10 of Fig. 6. Fig. 11 represents a section on line 11 11 of Fig. 9. Figs. 12, 13, and 14 represent the finishing-tool and devices for adjustably securing the same in the slide. Fig. 15 represents a perspective view of one of the gibs for securing the sectional cutters in the slide.

This invention, of which one form is embodied in the device illustrated in the drawings and now to be described, the said form having been selected as the best now known to me, may be employed in connection with a lathe of any type, though, as illustrated, it is particularly adapted for use upon a turret-lathe, such as illustrated in my Patent No. 457,967, dated August 18, 1891. As shown, it consists of a bed $a$, having on its surface a tongue $a'$ to fit in a groove in the turret A. (Indicated in dotted lines in Fig. 4.) At its forward end it is provided with a downward-projecting flange $a^3$ to bear against the edge of the turret, and it is secured to the latter by means of any suitable character. The bed is divided into two parts, of which one receives the slide $b$ and the other is provided with vertical journal-bearings $c\,c$, connected together by a web $c'$, the latter being apertured at $c^2$ to receive the stock. The front portion of the bed is provided with a transverse dovetail groove $a^4$ to receive the similarly-shaped tongues $b'\,b'$ on the slide $b$, said tongues being separated, as shown in Fig. 7, to permit the slide to be moved transversely of the bed a limited extent in either direction. There are bearing-blocks $a^{14}$ between the tongues and the wall of the dovetail groove, against which bear the screws $a^{15}$.

The under surface of the slide at its front and rear ends is formed with rack-teeth $b^2$, with which intermesh pinions $d\,d'$, secured to a longitudinally-arranged shaft $d^2$. This shaft rests in a groove $a^5$ in the bed and passes through a block $a^6$, arranged between the dovetailed tongues $b'$ of the slide, its end being covered by a thin plate $a^{12}$, secured to the end of the bed by screws $a^{13}$. When the shaft is rotated by means which I shall subsequently describe, the slide is fed laterally of the bed to bring either of the operating-tools into engagement with the stock.

The slide is formed with two upwardly-projecting side flanges $b^4 b^5$ to receive the roughing-out and finishing cutters $e f$.

The roughing-out tool, which may or may not be used in connection with or independently of the other parts of my invention, consists of a plurality or bank of cutters $e e$, arranged in a plane slightly inclined from the horizontal and projecting through an inclined slot $b^6$, formed in the upwardly-projecting flange $b^5$. The operative edges of the cutters form a line, either straight, curved, or irregular, corresponding to the shape which it is desired to give to the stock being operated upon, and the inner ends of the same are inclined or at an acute angle to the top edges of the same. (See Figs. 6 and 7.) These cutters are interchangeable and may be of different lengths, thickness, or heights, and by their arrangement are held at a proper angle relatively to the stock to secure a "top rake" thereon. The stock usually varies in cross-diameter, especially where handles and other articles are being turned, as clearly shown upon the drawings, and consequently if all of the tools were of the same thickness some of them would not have a top rake, and hence I form the cutters of different heights to correspond to the diameter of the stock, the cutters operating upon the thinnest part of the lathe being the least in thickness and those operating upon the thickest part of the stock being the greatest in thickness.

The ends of the cutters, as hereinbefore stated, are at an acute angle to the top edges thereof, so as to form perfect cutting edges, whereby when said ends are ground to sharpen said edges the cutters are not changed except in length. Although the cutters vary in length and thickness, as described and illustrated, yet their operating edges are all in the same plane.

Between the cutters are placed spacing plates or gibs $e'$, fitting snugly in the aperture or slot $b^6$ in the flange $b^5$, each gib having on its inner and upper corner a lug or lip $e^2$ to engage the inner face of the flange $b^5$. A set-screw $e^3$ is passed through the rear end of the flange $b^5$ and bears against the last cutter $e$ of the series of cutters. When this screw is driven in to bear firmly against the cutters, it binds them and the gibs firmly against the opposite inner end wall of the slot $b^6$, and as the lugs $e^2$ of the spacers or gibs bear positively against the flange $b^5$ the frictional engagement of the gibs and cutters is such that the latter are held firmly against displacement in any direction.

The finishing-cutter is shown as arranged diametrically opposite the roughing-out cutter, and consists of a substantially cylindrical body $f$, recessed to form an operative edge $f'$, which, as shown, is continuous from end to end. The body $f$ is arranged in a semicylindrical cavity in the flange $b^4$, and it is provided with two trunnions $f^2 f^3$, the former of which is journaled in an aperture in the end wall of the flange and the other is journaled in a semicircular plate $f^4$, arranged in the said cavity. This plate is held against rotation by a key $f^5$, and it is provided with a series or plurality of apertures $f^6$. The trunnion $f^3$ projects through the plate $f^4$ and is squared on its end to receive a sector-shaped plate $f^7$, likewise having its plurality of apertures $f^8$. The latter plate is forced on the square end of the trunnion, and its apertures are brought to register with the apertures $f^6$ on the plate $f^4$, after which a screw is thrust through the apertures to lock the two plates together, and consequently secure the finishing-tool against rotation. By removing the last-mentioned screw the said tool may be adjusted or another tool may be substituted therefor and held in another position. By employing the plate $f^4$, which is movable in the socket or cavity, I may use interchangeable finishing-cutters of different lengths or having differently arranged or shaped cutting edges. The apertures $f^6 f^8$ may be spaced differentially to provide a very nice adjustment of the finishing-cutter.

For the purpose of locking the plate $f^4$ against movement I provide a clamp $g$, which extends across the tops of the flanges $b^4 b^5$ and is provided on its ends with downwardly and inwardly projecting fingers $g' g'$, taking into grooves $b^8 b^9$ in said flanges. A set-screw $g^2$ is passed through the clamp and bears against the top of the flange $b^4$ to compress the top wall of the cavity down against the plate $f^4$ and clamp the latter between it and the bottom wall.

By the devices to be described the slide is first fed in the direction of the arrow shown in Fig. 6 to bring the sectional cutters $e e$ into engagement with the work to roughly shape it, (the turret being moved to a limited extent toward and from the chuck during the operation,) after which the slide is fed in the opposite direction to bring the finishing-tool into position. To provide stops to limit the movement of the slide, I pass through the tongues $b' b'$ adjusting-screws $b^{10}$, which are in alinement with the block $a^6$ and abut thereagainst.

The means for rotating the shaft $b^2$ to feed the slide consists of the following devices: The pinion $d'$ on the reduced end of the shaft $d^2$ is provided with worm-teeth $h$ to intermesh with the worms $h' h'$ on the ends of shafts $h^2 h^2$, journaled in the vertical bearings $c c$, before referred to. Instead of forming the pinion $d'$ and the worm-wheel integrally they may be formed separately and each secured rigidly to the shaft $d^2$. Upon the upper ends of the shafts $h^2$ are rigidly secured spur-gears $h^3$, which intermesh, and one of the shafts $h^2$ is elongated to receive a hand-wheel $h^4$, by means of which it may be rotated. The gears $h^3$ $h^3$ are inclosed within a housing $h^5$, through which the last-mentioned shaft $g^2$ passes, as shown in Fig. 5. Now it will be seen that as the hand-wheel $h^4$ is rotated the worms $h'$ $h'$ will be driven in opposite direction to rotate the slide-feeding shaft $d^2$ with great power and that the power will be applied equally to both sides of the shaft to rotate it evenly and smoothly and to prevent chattering of parts and also to prevent the threads from being stripped off.

From the foregoing it will be observed that I have provided a unique and peculiar finishing-tool by means of which the stock may be first roughly cut into any desired shape and then finished with nicety. The two sets of cutters—that is, the sectional cutter and the finishing-cutter—may be readily removed for the substitution of others, and they may be both adjusted and rigidly secured against movement after adjustment.

As said previously, the sectional cutters are independently adjustable, whereby their edges may be arranged above a plane radial to the work and parallel to the axes or top surfaces of the cutters, the thickness of the cutters being proportioned to their different distances from the axis of the cutters to secure a uniform top rake.

Having thus explained the nature of my invention and described a way of constructing and using the same, although without having attempted to set forth all the forms in which it may be embodied or all the modes of its use, I declare that what I claim is—

1. As a means for simultaneously cutting different diameters on a single rotating piece of work, a cutter-holder movable laterally with respect to the work, a bank of cutters carried thereby and arranged in a single row parallel to the axis of the work and having cutting edges adapted to engage the work, and means for securing the cutters at different distances from the axis of the work to form the different diametrical outlines thereof, said means comprising a plurality of gibs alternating with the cutters and each having a lug to positively engage said holder and hold it against movement relatively thereto, and devices for compressing or frictionally binding said gibs and cutters together.

2. As a means for simultaneously cutting different diameters on a single piece of work, a cutter-holder movable laterally with respect to the work, a bank of cutters carried thereby at an angle to the line of lateral movement, and having cutting edges adapted to engage the work above a plane radial to the work and parallel with the axes or top surfaces of the cutters, and means for securing the cutters at different distances from the axis of the work to form the different diametrical outlines thereof, the thickness of the cutters being proportioned to their different distances from the axis of the work to insure a top rake for each cutter of the bank.

3. As a means for simultaneously cutting different diameters on a single piece of work, a cutter-holder movable laterally with respect to the work and having an inclined portion, a bank of cutters supported by said inclined portion, and means for securing the cutters at different distances from the axis of the work to form the different diametrical outlines thereof, the height or thickness of said cutters being proportioned to their different distances from the axis of the work to secure a uniform top rake.

4. As a means for simultaneously cutting different diameters on a single piece of work, a cutter-holder movable laterally with respect to the work, a bank of cutters carried thereby at an angle to the line of lateral movement, and having cutting edges adapted to engage the work above a plane radial to the work and parallel with the axes or top surfaces of the cutters, the thickness of said cutters being proportioned to their different distances from the axis of the work to insure a uniform top rake, and means for securing said cutters to said holder, comprising a plurality of gibs engaged with said support and alternating with said cutters, and means for binding said cutters and gibs together.

5. As a means for simultaneously cutting different diameters on a single piece of work, a cutter-holder movable laterally with respect to the work, a bank of cutters carried thereby at an angle to the line of lateral movement, and having cutting edges adapted to engage the work above a plane radial to the work and parallel with the axes or top surfaces of the cutters, the thickness of said cutters being proportioned to their different distances from the axis of the work to insure a uniform top rake, and means for securing said cutters to said holder, comprising a plurality of gibs engaged with said support and alternating with said cutters, and a set-screw bearing laterally against said gibs and cutters to bind them together.

6. A tool for lathes, comprising a support, a plurality of alternating cutters and gibs or spacing-plates, each gib or spacing-plate being constructed to positively engage said support, and means for binding the cutters and gibs together, said cutters being unconfined longitudinally except by the frictional engagement of the gibs.

7. A tool for lathes, comprising a support having a slot or aperture, a plurality of alternating gibs and cutters, each gib positively engaging the said support, and means entering the end wall of said slot for binding the gibs and cutters frictionally together, said cutters being unconfined longitudinally except by the frictional engagement of the gibs.

8. A tool for lathes, having a support, a plurality of cutters arranged side by side and each being longitudinally adjustable, a plurality of gibs alternating with said cutters, each gib having a lug to engage said support and means for frictionally engaging the gibs and cutters.

9. A device for holding a plurality of cutters in any preferred relation, consisting of a holder arranged to move toward or from the work, and having a slot to receive said cutters and in which said cutters are adapted to move freely longitudinally, gibs in said slots and adapted to be placed between said cutters, said gibs having abutting surfaces to prevent their longitudinal movement, and means for clamping said cutters and gibs together.

10. A device for holding a plurality of cutters in any preferred relation, consisting of a holder adapted to move toward or from the stock and having a slot convergent to the path of movement of said holder; said slot being adapted to loosely receive cutters, a series of gibs in said slot and engaging said holder, and means for causing said gibs to lock the cutters in the slot in said holder at different distances from the axis of the work, the thickness of the cutters being proportioned to their different distances from the axis of the work to secure a top rake.

11. In a lathe, a support movable toward and from the stock and having a slot convergent to its path of movement, a series of cutters of different lengths in said slot, a series of gibs inserted between the cutters and positively engaged with said holder, and means for clamping the cutters and gibs together, whereby said cutters are unconfined longitudinally except by said gibs.

12. A tool for turning rotating stock, consisting of a support having a longitudinal slot, a bank of cutters in said slot adapted to move freely transversely thereof, a plurality of gibs alternating with said cutters and adapted to be freely removed from said slot, each gib having a part to positively engage a wall of the slot whereby it is held against rearward movement, and means for binding said cutters and gibs together whereby said cutters are unconfined except by the frictional engagement of the gibs.

13. A tool for turning rotating stock comprising a holder movable laterally with respect to the work, a bank of cutters adapted to operate simultaneously upon the work, and arranged in a single row parallel to the axis of the work, each cutter consisting of a straight shank beveled at the end to form a cutting edge, and being freely adjustable longitudinally in said support, and means including a plurality of gibs alternating with said cutters and each having a part positively engaging said holder, said gibs frictionally engaging the shanks of said cutters and holding them with their cutting edges at different distances from the axis of the work, and in position to secure a uniform top rake on the work irrespective of the diameter of the work cut thereby.

14. A tool of the character specified comprising a base, a plurality of cutters varying in length and height resting on said base, said cutters being freely adjustable longitudinally on said base, and being arranged to operate simultaneously on the work, gibs alternating with said cutters and each having a shoulder to engage said base whereby they are held against longitudinal movement, and a screw arranged transversely of said cutters and gibs and passing through said base to compress the gibs and cutters, whereby said cutters are positioned by said base and gibs, and are unconfined except by the frictional engagement of the gibs therewith.

15. A tool for lathes, comprising a laterally-movable support, a cutter mounted in said support and rotatably adjustable, and adjustable means including a perforated non-rotary plate and a pin on the cutter for securing said cutter after adjustment, whereby interchangeable cutters may be used.

16. A tool for lathes, comprising a support having a partially-cylindrical socket, a cutter in said socket, a plate non-rotatable in said socket, said cutter being trunnioned at one end in said support, and at the other end in said plate, means for locking said plate and cutter together, and means for contracting the walls of said socket to hold the plate against movement.

17. A box-slide-forming tool, comprising a bed, a slide adapted to receive one or more cutters, and having gear-teeth, a gear engaging said teeth, a worm-wheel connected to said gear, two oppositely-driven worms, geared together, and engaging said worm-wheel, and means for rotating said worms.

In testimony whereof I have affixed my signature in presence of two witnesses.

JAMES HARTNESS.

Witnesses:
 MARCUS B. MAY,
 E. BATCHELDER.